United States Patent [19]

Dow

[11] Patent Number: 4,575,858

[45] Date of Patent: Mar. 11, 1986

[54] PSK MODULATION BY TEMPORARILY INCREASING FREQUENCY TO ACHIEVE PHASE CHANGE

[76] Inventor: Joanne B. Dow, 852 First St., Hermosa Beach, Calif. 90254

[21] Appl. No.: 601,198

[22] Filed: Apr. 17, 1984

[51] Int. Cl.[4] .................. H03C 3/04; H04L 27/18
[52] U.S. Cl. ................................. 375/53; 375/46; 375/52; 375/56; 375/57; 375/67; 332/16 R; 332/30 V
[58] Field of Search .............. 332/16 R, 30 V; 331/179; 375/44, 46, 52, 53, 54, 47, 56, 57, 64, 67

[56] References Cited

U.S. PATENT DOCUMENTS

| | | | |
|---|---|---|---|
| 3,054,971 | 9/1962 | Khu | 331/108 B |
| 3,068,427 | 12/1962 | Weinberg | 332/30 |
| 3,506,784 | 4/1970 | Garland | 178/66 |
| 3,585,503 | 6/1971 | Rittenbach | 325/163 |
| 3,611,147 | 10/1971 | Rittenbach | 325/159 |
| 3,665,343 | 5/1972 | Thompson | 331/145 |
| 3,755,739 | 8/1973 | Okano | 375/57 |
| 3,784,914 | 1/1974 | Aillet | 375/54 |
| 3,909,748 | 9/1975 | Yuan et al. | 331/117 R |
| 4,052,682 | 10/1977 | Wilcox | 332/16 R |
| 4,174,505 | 11/1979 | Querry | 332/16 R |
| 4,210,879 | 7/1980 | Poitevin et al. | 332/16 R |
| 4,303,894 | 12/1981 | Akazawa | 332/16 T |

Primary Examiner—Robert L. Griffin
Assistant Examiner—Raymond C. Glenny

[57] ABSTRACT

A phase modulation low power integrated circuit communications arrangement which employs a frequency shift oscillator is disclosed. The frequency shift oscillator operates normally at a first frequency and is keyed to a second frequency for brief intervals to introduce cumulative first frequency phase change in an output signal. Subquadrature and larger increments of phase shift, spurious frequency component rejection with wave filters, and low power amplification of the modulated signal are also disclosed. Specifically, transitions in either (or both) of a pair of binary input signals cause a 45-degree (or 90-degree) phase shift in the phase-modulated carrier, unlike standard DQPSK modulation.

1 Claim, 2 Drawing Figures

PSK MODULATION BY TEMPORARILY INCREASING FREQUENCY TO ACHIEVE PHASE CHANGE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of phase and frequency modulation of a carrier for the transmission of information by cable or radiation or other transmission media.

Phase and frequency modulation are related techniques which have been employed in the signal communications art for many years. Phase and frequency modulation are closely related concepts but are clearly distinguished in a theoretical or rigorous discussion of modulation systems. The textbook "Information Transmission, Modulation, and Noise" authored by Mischa Schwartz and published by McGraw Hill Book Company Incorporated, in 1959, classifies phase modulation and frequency modulation to each be special cases of angle modulation; see chapter 3, section 7, page 113. This relationship is further discussed in the book "Modulation Theory" authored by H. S. Black and published by D. Van Nostrand Co., Incorporated, 1953; see Chapters 3 and 12. The material of the Schwartz and Black books is hereby incorporated by reference into the present specification.

The prior patent art includes several examples of modulating apparatus which operate according to the principles of phase modulation, frequency modulation and phase shift keying modulation. These patents include the following examples from the U.S. patent files.

The patent of Eric B. C. Khu, U.S. Pat. No. 3,054,971 discloses a frequency shift oscillator which provides for the switching of resistive elements in an RC network to produce modified feedback and frequency determination in an oscillator circuit. The Khu patent comtemplates the use of differing components and differing phase shift in a RC network in order to achieve a pair of oscillator output frequencies.

The patent of M. Weinberg, U.S. Pat. No. 3,068,427 discloses an arrangement for achieving frequency modulation in a crystal controlled oscillator through the use of voltage controllable capacitance elements. In the Weinberg apparatus a modulating signal moves the operating point of a semiconductor diode along a characteristic curve in order that varying diode capacitance and reactance be achieved in a tuned circuit. The intent of the Weinberg patent is to produce a small frequency variation in the operating point of a piezoelectric crystal in order that frequency modulation be achieved with a crystal controlled oscillator.

The patent of B. Garland, U.S. Pat. No. 3,506,784 discloses a frequency shift keying arrangement wherein oscillating signals of two different frequencies are achieved by transistor switching of a capacitor in a tuned circuit. The Garland apparatus is principally intended for use in the telegraph art and is concerned with the components used to embody a two frequency oscillator circuit.

The patent of O. E. Rittenbach, U.S. Pat. No. 3,585,503, concerns a phase modulation arrangement for transmitting binary information by selecting between two possible output signals having a precise predetermined phase relationship. The Rittenbach '503 apparatus employs a balanced modulator circuit and phase reversal that occurs over a finite time in order that the harmonic frequencies generated during the phase reversal transient be limited. The Rittenbach '503 apparatus transmits a signal which is composed of switch selected portions of waveforms taken from four phase and frequency related sources in order to achieve smooth phase reversal in the output wave.

The additional patent of O. E. Rittenbach, U.S. Pat. No. 3,611,147, discloses a phase modulated binary data transmission system which uses a variable frequency oscillator shifted between two operating frequencies in what has recently been called a minimum shift keying arrangement to change the phase relationship between the oscillator output signal and a reference signal. The Rittenback '147 patent contemplates the use of a kylstron oscillator and also includes a frequency controlling feedback network for maintaining the frequency stability of the kylstron oscillator. The waveforms h and j in FIG. 2 of the Rittenbach '147 patent illustrate the cumulative changing of output signal phase which occurs in response to pulse controlled periods of operation at the second klystron operating frequency.

The Rittenback '147 patent discloses the use of only two phase relations, zero and $\pi$ radians, between the modulated carrier and the reference signal and contemplates the occurrence of carrier phase shift over the entire duration of the controlling digital waveform. In the Rittenback FIG. 2 drawing the changing of phase shown in line J occurs continuously during the control signal which is shown in line H. The Rittenback patent, therefore, stresses slowly altering the phase by dwelling for equal times in the two differing output frequencies.

The patent of Shui Yuan, U.S. Pat. No. 3,909,748, discloses the use of electrically variable semiconductor capacitance element such as metal-insulator-semiconductor (MIS) diodes for controlling the resonant frequency of an oscillator tank circuit in response to the output of a binary data register. The Yuan patent is concerned with improvement over the use of a varactor diode as a frequency control element. According to one aspect of the Yuan patent, four frequency control MIS diodes are arranged in weighting networks having the one, two, four, eight binary coded decimal capacitance values.

The patent of Itsuo Atkazawa, U.S. Pat. No. 4,303,894, discloses a frequency modulating arrangement which employs a transistor as a variable capacitance element. One aspect of the Akazawa patent is the attainment of increased junction capacitance in the modulating transistor by way of the particular circuit employed.

SUMMARY OF THE INVENTION

An object of the present invention is to provide an improved phase shift keying arrangement which is both simple and low in cost.

Another object of the invention is to provide a frequency change phase shift Keyer which spends a majority of its time in one of two stable phase states on a single frequency.

Another object of the invention is to provide a quadrature phase shift keying arrangement which is especially useful at low power levels.

Another object of the invention is to provide a phase shift keying arrangement which is readily adapted to the circuitry and fabrication techniques used in the integrated circuit art.

Yet another object of the invention is to provide a phase shift keying arrangement which provides output signals that are free of amplitude changes during the interval of phase shifting.

DETAILED DESCRIPTION

Figure 1:
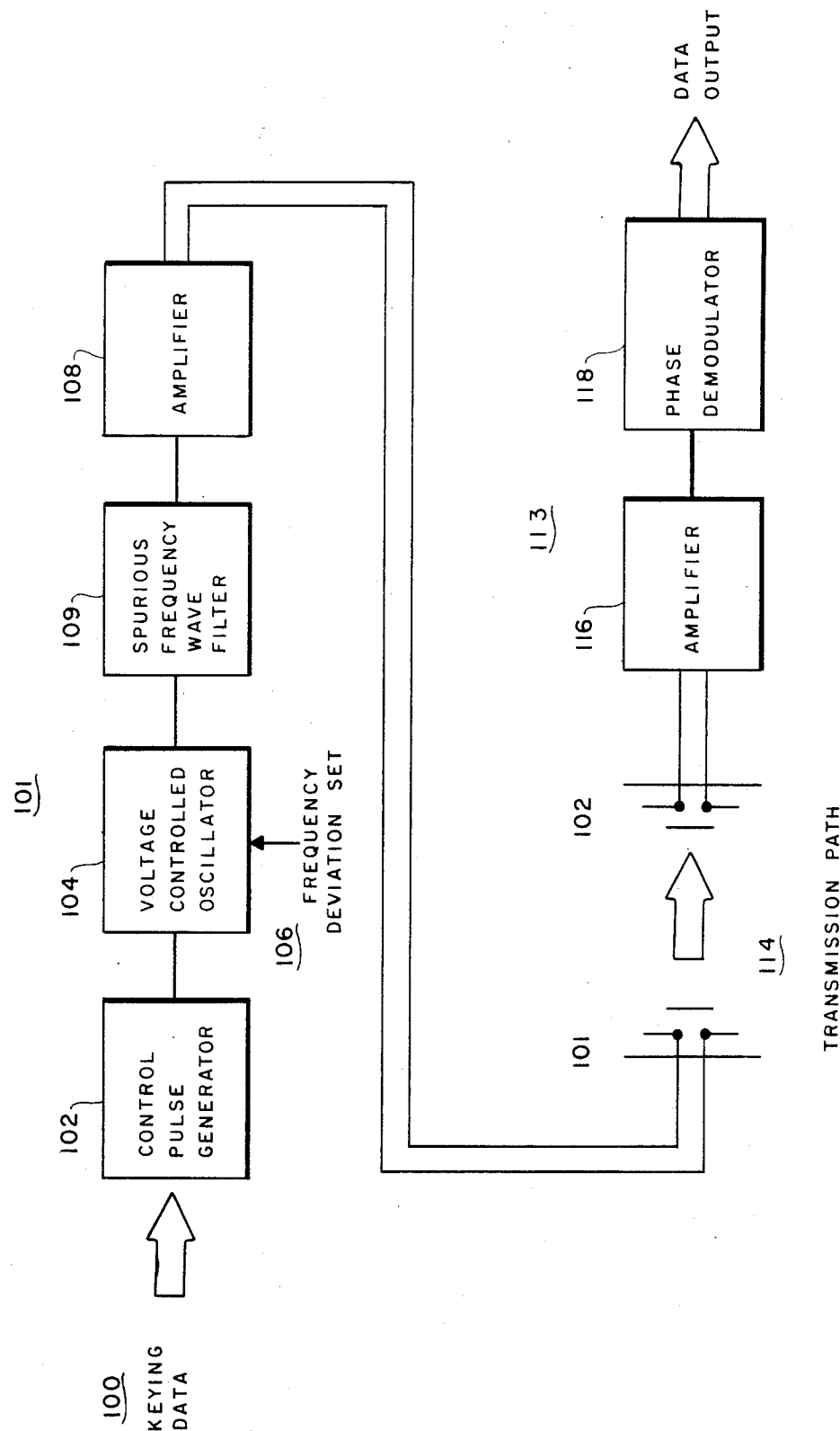
FIG. 1 of the drawing shows a phase modulation communications system made in accordance with the invention.

In FIG. 1 of the drawings there is shown a quadrature phase modulation apparatus which includes a source of keying data 100, a control pulse generator 102, and a voltage controlled oscillator (VCO) 104, which is coupled with an amplifier 108. The elements 102, 104, and 108 generally comprise a portion of a transmitting apparatus, 101, which may be operated at radio frequencies and connected to an antenna 110 or other transmission means for the transmission of subquadrature or other subdivision phase modulated signals. The FIG. 1 apparatus contemplates that signals from the transmitting apparatus 101 are to be coupled to a receiver 113 which includes an antenna 112, or other receptor means, amplifying apparatus 116 and a phase demodulator 118. Signals between the transmitter 101 and the receiver 113 are transmitted along a path 114 which may be a radiated path or alternately could comprise a cable or wire transmission line or other transmission arrangements which are known in the art.

According to the present invention the transmitting apparatus 101 includes a phase modulating circuit which is embodied in the form of a frequency modulated oscillator. This frequency modulated oscillator can be arranged according to one of the numerous frequency modulated oscillator arrangements which are known in the art; a voltage controlled oscillator as shown at 104 being preferred. Signals which are frequency modulated in the oscillator 104 are phase decoded, as contrasted with frequency decoding, by the phase demodulator 118. According to the intent of the invention the voltage controlled oscillator 104 is operable in either of a first or second output frequency modes according to the state of a binary control signal received from the control pulse generator 102.

If the voltage controlled oscillator 104 normally operates at a first frequency, in response to a first binary level from the control pulse generator 102; and is shifted briefly to operation at a second frequency for a time less than the first frequency operating time and then returned to first frequency operation, a cumulative phase change effect is produced in the output of the transmitter 101. This cumulative phase change or phase shift in the output of the transmitter 101 is detectible as phase modulation by the phase demodulator 118 in the receiver apparatus 113. The concept of using frequency modulation of a brief time duration in the transmitting apparatus and phase demodulation in the receiving apparatus is found to provide certain advantages in simplification and size reduction of the transmitting apparatus 101 as is described subsequently.

The FIG. 1 apparatus may also include an electric wave filter 109 for removing spurious frequencies introduced by keying of the voltage controlled oscillator 104. In some applications of the FIG. 1 apparatus the spurious frequencies introduced by modulation of the oscillator 104 are not objectionable or alternately are attenuated by other elements of the transmitting apparatus 101 to a degree permitting elimination of the wave filter 109.

The transmission path 114 in FIG. 1 may alternately be comprised of coaxial cable or light transmitting media such as fiber optic bundles. A light transmission arrangement would be terminated by appropriate light/electrical transducer elements in lieu of the amplifiers 108 and 116. Other transmission media which are known in the art can also be employed at 114.

The voltage controlled oscillator 104 in FIG. 1 is shown to include a frequency deviation setting input 106 which is used to determine the magnitude of oscillator output frequency change achieved with a given change of input voltage. It is desired in achieving the intended results from the invention that a precise and repeatable predetermined increment of oscillator frequency change and phase change result from the change of control pulse generator signals from a first to a second binary output level for a brief predetermined time, the second level time being less than the first level time and preferably less than twenty percent of the first level time. The illustrated voltage controlled oscillator may of course be replaced by a current controlled oscillator or other circuit arrangements which achieve a change in output frequency in response to the change of a digital control signal.

Figure 2:
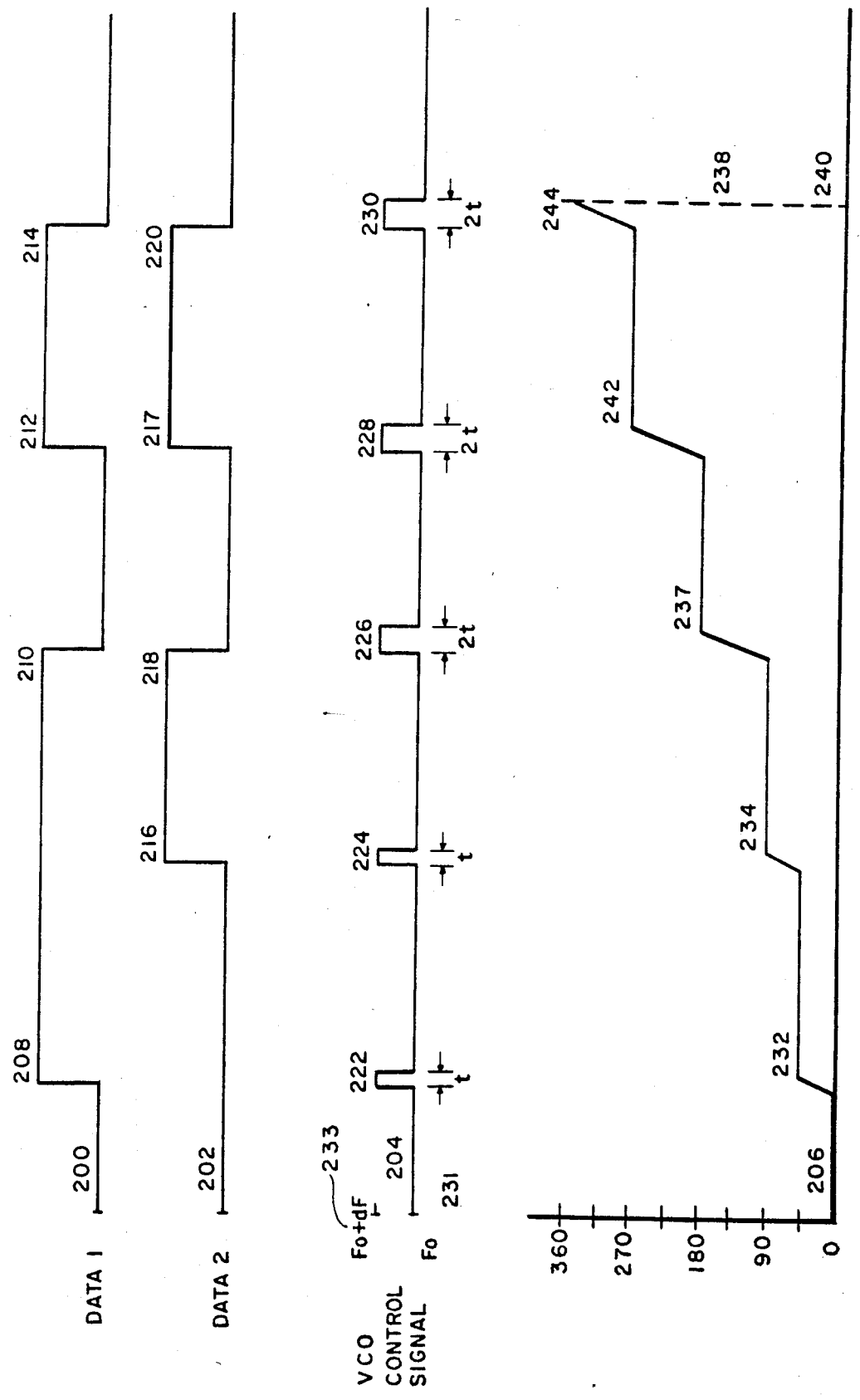
FIG. 2 of the drawings shows a series of signal waveforms which describe operation of the FIG. 1 system.

In FIG. 2 of the drawings there is shown a series of waveforms 200–206, which describe the operation of the FIG. 1 apparatus in greater detail. The FIG. 2 waveforms include a pair of data signals 200 and 202 which are also identified as data 1 and data 2 and which might correspond to the keying data 100 in FIG. 1. The FIG. 2 waveforms also include a pulse waveform 204 which is derived from the data 1 and data 2 signals according to a first predetermined algorithm and which is used to control the output frequency of the voltage controlled oscillator according to a second predetermined algorithm, the second algorithm is also determined by the frequency deviation input 106 shown in FIG. 1.

In the FIG. 2 waveforms a change in either of the two data input waveforms 200 and 202 is associated with the generation of a control pulse, in the waveform 204, of time duration t. A simultaneous change in both waveforms 200 and 202 in FIG. 2 results in a control pulse of time duration 2t in the waveforms 204 and a phase change of 90° in the output phase waveform 206. This t increment relationship is illustrated by the single waveform changes at 208, and 216 which result in the control signal pulses of duration t at 222, and 224 respectively. The simultaneously occuring changes at 210–218, 212–217 and 214–220 in FIG. 2 result in the control signal pulses of double width as shown at 226, 228 and 230 in FIG. 2.

The two levels of the pulsed waveform 204 control the operation of the voltage controlled oscillator and cause it to provide respective output signals at a first frequency which is indicated as $F_O$ and at a second frequency which is indicated as $F_O+dF$, these frequencies are indicated at 231 and 233 respectively.

The cumulative phase relationship between the output of the voltage controlled oscillator 104 and a reference oscillator signal, which is not shown, is presented by the waveform 206 in FIG. 2. As indicated in the initial portion of the waveform 206 the voltage controlled oscillator initially has an output which is exactly in phase with the reference oscillator; this is shown by the indication of zero phase difference. This phase relationship changes to 45° of separation during the interval of pulse 222 and subsequently changes to relationships of 90°, 180°, 270°, and 360° in response to the VCO control pulses 224–230 as is indicated respectively by the phase transitions at 234, 237, 242 and 244.

The phase transition 244 appears somewhat different that the other transitions because the phase relationship with the reference oscillator commences at 270° at the start of control pulse 230 and reaches 360° at the end of this control pulse. Since 360° is the same phase position as 0° the dotted line 238 indicates a return to the 0° phase relationship at 240 in FIG. 2.

In the present invention it is desirable for the control pulses 222–230 to have brief but finite and significant time duration with respect to the time between control pulses. As previously stated this ratio preferably maintains the phase changing time, t, less than twenty percent of the intervening phase constant time, with the minimum phase changing time being about one-half percent of this phase constant time. This time ratio is in contrast with the ratios usually employed with a balanced mixer or other forms of frequency shift keying circuitry wherein time ratios near one to one-hundred or one to one-thousand are often employed. In the present invention the control pulse 222 for example might have a time duration of two microseconds with a spacing between pulses of some longer time as determined by the above ratios. Use of these relatively large control pulse times in the present invention decreases the spurious frequency output of the voltage control oscillator and provides a more desirable output signal spectrum for most applications of the invention.

The use of a phase demodulator to obtain information from a frequency modulated oscillator operated in accordance with the control signal 204 in FIG. 2 has a basis in the classical literature wherein the phase relationship of a signal is frequently defined by the mathematical integral of frequency and time over a defined time interval, or by the relationship $$\text{phase} = \int_0^T f \, dt.$$

Alternately, frequency of a signal is often said to be the rate of change of phase with time in the signal, mathematically this can be stated as:

$$\text{frequency} = d\,\text{phase}/dt$$

Further discussion of the theoretical relationships attending the present invention are to be found in the text books by Schwartz and Black which were earlier incorporated by reference.

The waveforms at 206 in FIG. 2 represent a phase modulation arrangement wherein each of the control pulses 222–230 results in a phase shift of 45° or a multiple of 45°. Other phase relationships wherein each control pulse provides a carrier phase shift of 60° or 90° or 120° or some other predetermined number of degrees other than 45° are readily achieved. In either the alternate or the illustrated phase shift arrangement, the time duration of the control pulses 222–230 and the frequency difference realized during the interval of the control pulse can be adjusted according tp the above mathematical relationship to produce the desired degree of phase shift for the normal operating frequency.

A phase modulator made in accordance with the present invention is readily adapted to fabrication in integrated circuit form using a voltage controlled multivibrator or other oscillator circuit which is known in the integrated circuit art. Usually such circuits achieve output frequency change by varying the magnitude of an internal current and thereby changing the discharge time of an internal capacitor.

It is especially to be noted that a modulator made in accordance with the invention does not require the use of inductance elements or voltage variable capacitance elements such as would make fabrication in the form of an integrated circuit difficult. Commercially available integrated circuit packages such as the Tektronix Incorporated 74 LS 221 multivibrator or the Motorola Inc. MECL 1658 voltage controlled multivibrator are possible circuit types for embodying the voltage controlled oscillator 104 in FIG. 1. The Motorola MECL 1658 circuit is capable of performance in the 100–150 megahertz frequency range and is characterized to provide an output frequency of about thirty-five megahertz in response to a control voltage of negative two volts and an output frequency of about 150 megahertz in response to a control voltage of zero volts. As indicated by this sensitivity to control voltage, careful regulation or closed loop circuitry may be desirable to ensure precise phase shift increments in response to the pulses 222–230 in FIG. 2.

The automatic frequency control apparatus commonly used in a F.M. radio receiver to maintain precise receiver tuning could also be modified into a form suitable for performing the frequency change function of the voltage controlled oscillator 104 in FIG. 1. Automatic frequency control circuits of this type often employ varactor diodes or voltage variable transistor junction capacitances or other variable semiconductor element parameters to achieve the needed frequency variations.

The modulation apparatus of the present invention is most desirable for use in low power equipment such as might, for example, have an output power of ten watts or less, in view of the spurious frequency components inherent in the output signal and because of the preferred semiconductor component or integrated circuit embodiment of the invention; such equipment as emergency transmitters, personnel paging reply transmitters and other low power short distance communication links are therefore the greatest potential uses of the invention. The modulator is also well suited to be used in a cable transmission environment wherein interference with other signals is not a problem. Although output power in the zero to ten watt range might be obtained directly from an oscillator circuit used at 104 in FIG. 1 the use of an amplifier as shown at 108 is to be preferred.

A phase modulation arrangement made according to the present invention offers the advantages of small size, circuit simplicity, freedom from inductive components, need for only a single control signal, and stable amplitude during phase transition intervals when compared to the double balanced mixer circuit or other circuits which are normally employed for phase modulation. Stability of the output amplitude during changes of the carrier frequency and phase is especially desirable in some applications of the invention.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. Short distance, low power phase shift keyed communication apparatus comprising:

control circuit means for generating a pair of encoded data binary signals each of recurrent time period p from a data input signal, and for generating a recurrent binary keying signal having selected predetermined active time segments of duration t, between one-half and twenty percent of said period p, in response to one data transition occurrence within said pair of encoded data binary signals and for generating a recurrent binary keying signal having predetermined active time segments of duration 2t, between one and forty percent of said period p, in response to simultaneous data transition occurrences within said pair of encoded data keying signals;

multivibrator oscillator radio frequency signal generating means, including a controlled capacitor charge current frequency determining network, operable at first and second predetermined radio frequencies in time segments responsive to said recurrent binary keying signal, each said second radio frequency operation segment being for a selected predetermined time interval of said t and 2t duration binary keying signal and with second frequency operation for said predetermined time segment generating a predetermined phase shift modulation of forty-five degrees for duration t and ninety degrees for duration 2t with respect to said first frequency;

radio frequency wave filter means for generating a filtered radio frequency signal of limited spurious frequency content from said first and second frequency time segmented multivibrator oscillator radio frequency signal;

radio frequency amplifier means generating from said filtered radio frequency signal an amplified radio frequency signal of power level below ten watts;

propagation means for communicating said amplified radio frequency signal to a remote signal reception locus; and phase demodulation means located in said remote reception locus for demodulating the communicated frequency shift modulated radio frequency signal and reconstructing said data input signal therefrom.

* * * * *